United States Patent
You

(10) Patent No.: US 12,472,979 B2
(45) Date of Patent: Nov. 18, 2025

(54) METHOD, APPARATUS, STORAGE MEDIUM, AND DEVICE FOR PLANNING VEHICLE TRAJECTORY

(71) Applicant: TENCENT TECHNOLOGY (SHENZHEN) COMPANY LIMITED, Shenzhen (CN)

(72) Inventor: Changxi You, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 301 days.

(21) Appl. No.: 17/977,424

(22) Filed: Oct. 31, 2022

(65) Prior Publication Data

US 2023/0079202 A1 Mar. 16, 2023

Related U.S. Application Data

(63) Continuation of application No. PCT/CN2021/142314, filed on Dec. 29, 2021.

(30) Foreign Application Priority Data

Jan. 7, 2021 (CN) .......................... 202110019580.9

(51) Int. Cl.
*B60W 60/00* (2020.01)
*B60W 30/12* (2020.01)
(Continued)

(52) U.S. Cl.
CPC ........ *B60W 60/0011* (2020.02); *B60W 30/12* (2013.01); *B60W 40/068* (2013.01);
(Continued)

(58) Field of Classification Search
CPC ............ B60W 60/0011; B60W 30/12; B60W 30/18145; B60W 30/18163;
(Continued)

(56) References Cited

U.S. PATENT DOCUMENTS 10,831,210 B1 * 11/2020 Kobilarov ......... B60W 60/0013
2015/0360688 A1 12/2015 Tanaka et al.
(Continued)

FOREIGN PATENT DOCUMENTS

CN 107340772 A 11/2017
CN 109375632 A 2/2019
(Continued)

OTHER PUBLICATIONS

The European Patent Office (EPO) The Extended European Search Report for 21917321.8 May 15, 2024 9 Pages.
(Continued)

*Primary Examiner* — Aaron L Troost
(74) *Attorney, Agent, or Firm* — Anova Law Group, PLLC

(57) ABSTRACT

A vehicle trajectory is planned. An initial reference trajectory of a target vehicle within a target planning duration is acquired. The initial reference trajectory includes an initial state variable and an initial control variable of the target vehicle at at least one position point. A reference lane trajectory is acquired. A trajectory cost of the target vehicle is determined according to a geometric constraint and a dynamics constraint by using the reference lane trajectory and the initial state variable and the initial control variable of the target vehicle at the at least one position point. A target vehicle is controlled to adjust from the initial reference trajectory of the target vehicle to a target travelling trajectory according to the trajectory cost of the target vehicle.

15 Claims, 7 Drawing Sheets

(51) Int. Cl.
*B60W 40/068* (2012.01)
*B60W 40/105* (2012.01)
*B60W 40/114* (2012.01)

(52) U.S. Cl.
CPC ........ *B60W 40/105* (2013.01); *B60W 40/114* (2013.01); *B60W 60/0015* (2020.02); *B60W 2520/14* (2013.01); *B60W 2552/40* (2020.02); *B60W 2552/53* (2020.02)

(58) Field of Classification Search
CPC ............. B60W 40/068; B60W 40/105; B60W 40/114; B60W 60/0015; B60W 2520/14; B60W 2552/40; B60W 2552/53; B60W 2720/10; B60W 2720/12; B60W 2720/14; G05D 1/0217; G05D 1/0212
See application file for complete search history.

(56) References Cited

U.S. PATENT DOCUMENTS

| | | | |
|---|---|---|---|
| 2018/0017971 | A1 | 1/2018 | Di Cairano et al. |
| 2020/0294394 | A1* | 9/2020 | Guo .................. G08G 1/096783 |
| 2020/0363806 | A1* | 11/2020 | Kobilarov .............. G06V 20/56 |
| 2020/0363816 | A1 | 11/2020 | Zuo et al. |
| 2020/0398894 | A1* | 12/2020 | Hudecek .............. G05D 1/0214 |

FOREIGN PATENT DOCUMENTS

| | | |
|---|---|---|
| CN | 109684702 A | 4/2019 |
| CN | 111679678 A | 9/2020 |
| CN | 112677995 A | 4/2021 |
| DE | 102015221626 A1 | 5/2017 |
| EP | 2881829 A2 | 6/2015 |
| JP | 2015058890 A | 3/2015 |
| JP | 2015230547 A | 12/2015 |
| JP | 2016000563 A | 1/2016 |
| JP | 2017084110 A | 5/2017 |
| JP | 2019513612 A | 5/2019 |
| JP | 2019199185 A | 11/2019 |
| KR | 101716417 B1 | 3/2017 |
| WO | 2014118962 A1 | 8/2014 |

OTHER PUBLICATIONS

Christian Gotte et al. "Spline-based motion planning for automated driving." IFAC-PapersOnLine 50.1 (2017):9114-9119.
Boliang Yi et al. "Model predictive trajectory planning for automated driving." IEEE Transactions on Intelligent Vehicles, vol. 4, No. 1, Mar. 2019, pp. 24-38.
The Japan Patent Office (JPO) Notification of Reasons for Refusal for Application No. 2023-520281 and Translation Mar. 19, 2024 13 Pages.
The World Intellectual Property Organization (WIPO) International Search Report for PCT/CN2021/142314 Feb. 14, 2022 8 Pages (including translation).

* cited by examiner

METHOD, APPARATUS, STORAGE MEDIUM, AND DEVICE FOR PLANNING VEHICLE TRAJECTORY

CROSS-REFERENCES TO RELATED APPLICATIONS

This application is a continuation application of PCT Patent Application No. PCT/CN2021/142314, entitled "METHOD AND APPARATUS FOR PLANNING TRAJECTORY OF VEHICLE, STORAGE MEDIUM, AND DEVICE" and filed on Dec. 29, 2021, which claims priority to Chinese Patent Application No. 202110019580.9, entitled "METHOD, APPARATUS, STORAGE MEDIUM, AND DEVICE FOR PLANNING VEHICLE TRAJECTORY" filed with the China National Intellectual Property Administration, PRC on Jan. 7, 2021, the entire contents of both of which are incorporated herein by reference.

FIELD OF THE TECHNOLOGY

The present disclosure relates to the technical field of autonomous driving, and in particular, to a method, an apparatus, a storage medium, and a device for planning a vehicle trajectory.

BACKGROUND OF THE DISCLOSURE

As an important application of artificial intelligence, the autonomous driving technology has made significant advances in recent years. The goal of the autonomous driving is to realize that a vehicle autonomously advances along a road in an unmanned state, ensure the safety of the vehicle while reaching a destination as soon as possible, and also ensure no direct or indirect threat posed to the safety of other traffic participants.

To achieve the foregoing goal, autonomous driving software requires a plurality of key systems, one of which is a trajectory planning system. Trajectory planning is intended to plan a trajectory that meets requirements for vehicle dynamics. The trajectory is required to be able to avoid surrounding obstacles (a vehicle, a pedestrian, a static obstacle, and the like) and conform to the instructions of the decision layer (keeping a lane, changing lanes, and pulling over).

SUMMARY

An embodiment of the present disclosure provides a vehicle trajectory planning method, including: acquiring an initial reference trajectory of a target vehicle within a target planning duration, the initial reference trajectory including an initial state variable and an initial control variable of the target vehicle at least one position point within the target planning duration; acquiring a reference lane trajectory; determining a trajectory cost of the target vehicle according to a geometric constraint and a dynamics constraint by using the reference lane trajectory and the initial state variable and the initial control variable of the target vehicle at the at least one position point, the dynamics constraint including at least one of an energy loss, an acceleration constraint, or an angular speed constraint; and adjusting the initial reference trajectory of the target vehicle to a target travelling trajectory according to the trajectory cost of the target vehicle.

An embodiment of the present disclosure provides a vehicle trajectory planning apparatus, including: an acquisition unit, configured to acquire an initial reference trajectory of a target vehicle within a target planning duration, the initial reference trajectory including an initial state variable and an initial control variable of the target vehicle at least one position point within the target planning duration; the acquisition unit being further configured to acquire a reference lane trajectory; a cost unit, configured to determine a trajectory cost of the target vehicle according to a geometric constraint and a dynamics constraint by using the reference lane trajectory and the initial state variable and the initial control variable of the target vehicle at the at least one position point, the dynamics constraint including at least one of an energy loss, an acceleration constraint, or an angular speed constraint; and an adjustment unit, configured to adjust the initial reference trajectory of the target vehicle to a target travelling trajectory according to the trajectory cost of the target vehicle.

An embodiment of the present disclosure further provides a non-transitory computer-readable storage medium, storing a computer program, the computer program, when executed by a processor, implementing the vehicle trajectory planning method provided in the embodiments of the present disclosure.

An embodiment of the present disclosure further provides an electronic device, including a memory and a processor, the memory storing a computer program executable on the processor, the computer program, when executed by the processor, causing the processor to implement the vehicle trajectory planning method provided in the embodiments of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
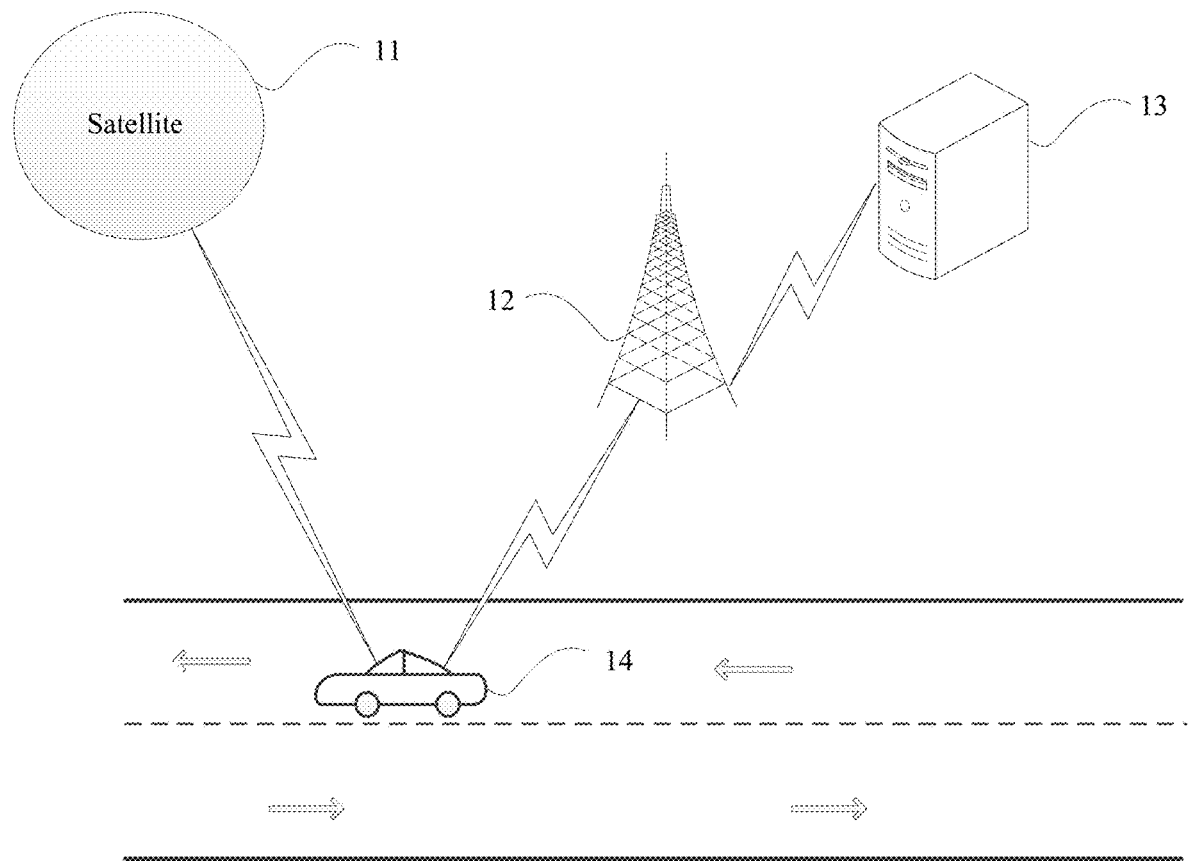
FIG. 1 is a schematic diagram of a system architecture of a vehicle trajectory planning method according to an embodiment of the present disclosure.

To make the objectives, technical solutions, and advantages of the present disclosure clearer, the following further describes the present disclosure in detail with reference to the accompanying drawings. Apparently, the described embodiments are merely a part rather than all the embodiments of the present disclosure. Based on the embodiments in the present disclosure, all other embodiments obtained by a person skilled in the art without paying any creative efforts all fall within the protection scope of the present disclosure.

As used herein, the term "exemplary" means "used as an example, embodiment, or illustrative." Any embodiment described as "exemplary" is not necessarily explained as being superior or better than other embodiments.

The terms "first" and "second" in this specification are used for descriptive purposes only and are not to be construed as indicating or implying relative importance or implicitly indicating the number of technical features indicated. Therefore, a feature defined to be "first" or "second" may explicitly or implicitly include one or more features. In the description of the embodiments of the present disclosure, unless otherwise stated, "a plurality of" refers to two or more.

In the following, some terms in the embodiments of the present disclosure are described for ease of understanding by a person skilled in the art.

Autonomous driving: The autonomous driving means being capable of providing instructions and decisions for a vehicle traveling task without a need of a physical driving operation of a test driver and performing a control behavior as the test driver to complete a safe traveling function of a vehicle.

Autonomous driving system: The autonomous driving system includes different levels of systems that implement autonomous driving functions of a vehicle, such as an assisted driving system (L2), a high-speed autonomous driving system requiring human supervision (L3), and a highly/fully autonomous driving system (L4/L5).

Trajectory planning: The trajectory planning is intended to calculate a smooth trajectory through an initial state (including a start position, a speed, and an acceleration) and a target state (including a target position, a speed, and an acceleration) of the vehicle that are given, an obstacle position, and constraints on dynamics and comfort, so that the vehicle can reach a target state along this trajectory. The trajectory planning includes path planning and speed planning. The path planning is responsible for calculating a smooth path from a start position to a target position, while the speed planning is responsible for calculating a speed at each path point on the basis of this path, thereby forming a speed curve.

A metamethod, that is, a trajectory planning mode, is a basic method for resolving trajectory planning problems. In the metamethod, segmentation into smaller cells is not allowed. Invoking the metamethod once means outputting a trajectory from the start position to the target position, and a complete trajectory of the vehicle from a start position to a destination position is connected by trajectories outputted by continuously invoking different metamethods/a same metamethod.

Ground coordinate system: The ground coordinate system is a coordinate system fixed to a surface of the earth. An OX axis is any direction pointing to a ground plane. An OZ axis is vertically upward, and an OY axis is perpendicular to a plane formed by the OZ axis, so as to form a right-handed coordinate system. The coordinate system may be regarded as an inertial coordinate system when the earth rotation and the curvilinear motion of the center of mass of the earth are ignored.

A Frenet coordinate system is also referred to as a road coordinate system. A start position of the vehicle is used as the origin, coordinate axes are perpendicular to each other and are divided into an s-axis direction (that is, a tangential direction along a road reference line, referred to as a transverse direction) and an 1-axis direction (that is, a current normal direction of the reference line, referred to as a longitudinal direction), and coordinates are expressed as (s, 1).

In a rectangular coordinate system, the start position of the vehicle is used as the origin, coordinate axes are perpendicular to each other and are divided into an x direction and a y direction, and coordinates are expressed as (x, y).

Leading vehicle: The leading vehicle is a closest environment vehicle in a target lane that appears (is about to appear) in front of the vehicle during travelling of an autonomous driving vehicle.

Reinforcement learning (RL): The RL belongs to a field in machine learning, which emphasizes how to act based on the environment to maximize expected benefits and is widely applied to motion control. The RL is essentially a control algorithm. In most contexts, RL means a model-free RL algorithm, and model-dependent control methods such as a linear quadratic regulator (LQR) and MPC are classified as model-based RL, for which the assumption is that dynamic characteristics of the environment are known. The model-based RL is often considered to have higher sample utilization efficiency.

The following further describes the present disclosure in detail in combination with the accompanying drawings and specific embodiments.

There are many related schemes for trajectory optimization, for example, a trajectory smoothing algorithm using a polynomial curve on a 2D plane based on geometric information, a trajectory search algorithm for seeking a shortest feasible path, an optimal trajectory sampling method, and a trajectory optimizer that handles a complex nonlinear constraint based on sequential quadratic programming (SQP) or an interior point optimizer (Ipopt).

The foregoing trajectory smoothing methods based on geometric information often can be used for dealing with only the planning problem of a spatial trajectory, and are not suitable for dealing with the problem of speed planning. In addition, the obtained planned trajectory is often not smooth enough, and an additional smoothing algorithm is required to be designed. Such methods often can be used for dealing with only constraints with respect to road geometries and vehicle geometries, and are difficult to deal with complex nonlinear and dynamically changing constraints, such as a dynamics constraint. That is to say, such methods do not have the ability to optimize dynamic changes, and have low stability and safety when applicable to an autonomous driving vehicle. An algorithm based on sampling and optimization can be used for dealing with problems of trajectory and speed planning in a complex scenario, but is not flexible enough in design, and the solving efficiency of a computing platform often limits the wide use of the algorithm. In the foregoing solutions, either the complex nonlinear problem is difficult to deal with, or the solving efficiency is insufficient. Therefore, the solutions cannot satisfy cost control requirements.

In order to resolve the technical problems in the related art, embodiments of the present disclosure provide a method, an apparatus, an electronic device, and a storage medium for planning a vehicle trajectory. The embodiments of the present disclosure relate to artificial intelligence (AI)

and machine learning (ML) technologies, and are designed based on the autonomous driving technology and the machine learning in AI.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. Basic AI technologies generally include technologies such as sensors, dedicated AI chips, cloud computing, distributed storage, big data processing technologies, operating/interaction systems, and mechatronics.

Autonomous driving technologies usually include high-precision maps, environment perception, behavior decision-making, path planning, motion control, and other technologies. Self-determined driving technology has a wide range of application prospects.

With the research and progress of the AI technology, the AI technology is studied and applied in a plurality of fields such as a common smart home, a smart wearable device, a virtual assistant, a smart speaker, smart marketing, unmanned driving, autonomous driving, an unmanned aerial vehicle, a robot, smart medical care, and smart customer service. It is believed that with the development of technologies, the AI technology will be applied to more fields, and play an increasingly important role.

ML is a multi-field interdisciplinary subject involving the probability theory, statistics, the approximation theory, convex analysis, the algorithm complexity theory, and the like. ML specializes in studying how a computer simulates or implements a human learning behavior to acquire new knowledge or skills, and reorganize an existing knowledge structure, so as to keep improving its performance. The ML is the core of the AI, is a basic way to make the computer intelligent, and is applied to various fields of AI. ML and DL usually comprise technologies such as artificial neural network, belief network, reinforcement learning, transfer learning, and inductive learning.

The embodiments of the present disclosure adopt a trajectory optimization method to comprehensively deal with the problems of path planning and speed planning. Constraints with respect to road geometries and vehicle geometries are considered, and the dynamics constraint includes an energy loss, an acceleration constraint, and an angular speed constraint of a target vehicle, that is, feasibility of the vehicle trajectory planning under the dynamics constraint is considered. Therefore, the embodiments of the present disclosure are better adapted to the complex nonlinear and dynamically changing dynamics constraint during travelling of the vehicle, thereby improving the safety and stability of autonomous driving.

The vehicle trajectory planning method provided in this embodiment of the present disclosure may be applicable to various autonomous driving vehicles. The autonomous driving vehicle includes autonomous driving systems at L2, L3, L4 and above levels, and is mainly applicable to a scenario of lane keeping and automatically adapts to unevenness, curvature changes, and the like of a lane line ahead for which sensing is weak, so as to improve the stability and comfort of the autonomous driving. In this embodiment of the present disclosure, it is assumed that a target vehicle speed of the target vehicle may be acquired from an upstream module, and that the upstream module may adapt to different scenarios (car following, lane changing, and the like) by adjusting the target vehicle speed. Therefore, the method for processing a dynamic obstacle is not discussed in this embodiment of the present disclosure.

An application scenario of the vehicle trajectory planning method provided in this embodiment of the present disclosure may be shown in FIG. 1.

FIG. 1 shows a schematic diagram of an application scenario of a vehicle trajectory planning system according to an embodiment of the present disclosure. The application scenario includes a satellite 11, a base station 12, a server 13, and an autonomous driving vehicle 14.

The autonomous driving vehicle 14 is equipped with an onboard terminal device. The onboard terminal device may be an electronic device such as a smart phone, a tablet computer, a portable computer, or a computer, on which an autonomous driving system of this embodiment of the present disclosure is installed, so as to implement the vehicle trajectory planning method provided in this embodiment of the present disclosure.

Certainly, a vehicle travelling trajectory may also be planned by the server 13, and the planned vehicle travelling trajectory is transmitted to the onboard terminal device in the autonomous driving vehicle 14 through the satellite 11 and the base station 12, so as to control the autonomous driving vehicle 14 to drive according to the planned vehicle travelling trajectory.

In some embodiments, when the server 13 shown in FIG. 1 is physically deployed, the server 13 may be deployed as an independent service device, or the server 13 may be deployed as a cluster device composed of a plurality of service devices, which is not limited in this embodiment of the present disclosure.

Figure 2:
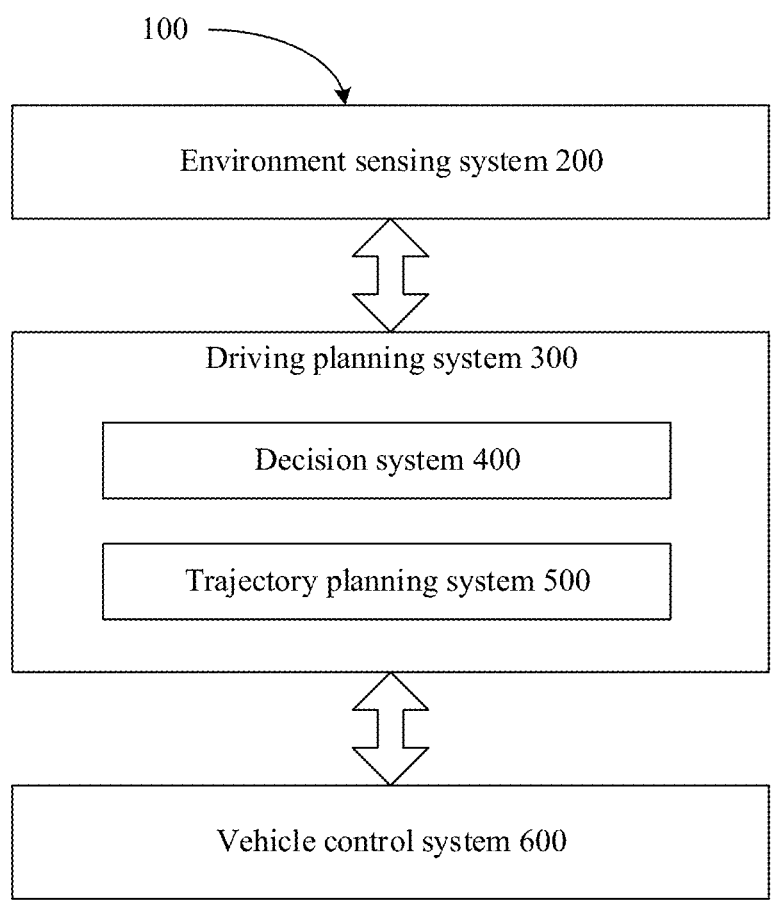
FIG. 2 is a schematic structural diagram of an autonomous driving system according to an embodiment of the present disclosure.

An autonomous driving system 100 in the foregoing application scenario is shown in FIG. 2, including an environment sensing system 200, a driving planning system 300, and a vehicle control system 600. It may be understood that the foregoing systems included in the autonomous driving system 100 may also be referred to as subsystems or modules in some embodiments, which are to be described below.

The environment sensing system 200 is configured to sense environment information, including a position, a speed, and an orientation of an obstacle in the environment and classified objects (such as a vehicle, a pedestrian, and a bicycle). In some embodiments, a state (including a speed, an acceleration, and a direction) of the vehicle may further be perceived, or a high-precision map of a real-time position of the vehicle may be acquired from the satellite 11 in FIG. 1.

A decision system 400 in the driving planning system 300 is configured to perform prediction on the perceived obstacles according to the environment information, a target position, an objective physical law, the obstacles, a surrounding environment, and accumulated historical data knowledge, so as to make macroscopic decisions, thereby ensuring the vehicle to smoothly reach a target state.

In some embodiments, decisions made by the decision system 400 include road selection, lane selection, a reference vehicle speed, whether to normally follow obstacles (such as people, vehicles, and the like) on a road, whether to bypass obstacles (such as people, vehicles, and the like), whether to stop, whether to wait to give way when encountering traffic lights and pedestrians, whether to pass by other vehicles at intersections, and the like.

A trajectory planning system 500 in the driving planning system 300 is configured to plan an ideal trajectory according to the environment sensing information and decisions made by the decision system 400, including selecting path points passed by a trajectory and a speed, an orientation, and an acceleration of a vehicle when reaching each path point. The path points maintain continuity in time and space, and parameters such as the speed, the orientation, and the acceleration of each path point all fall within an actual operable physical range of the vehicle.

The vehicle control system 600 is configured to receive a trajectory planned by the trajectory planning system 500, perform a dynamical calculation in combination with attributes of a vehicle body and external physical factors, convert a result of the calculation to vehicle control parameters such as a throttle amount, a brake amount, a steering wheel signal, and the like for electronic control of the vehicle, and perform operations according to the parameters, so as to control the vehicle to achieve trajectory points in the trajectory.

An exemplary application implementing the autonomous driving system of this embodiment of the present disclosure is to be still described.

In some embodiments, various subsystems in the autonomous driving system 100 shown in FIG. 2 may be packaged as a whole. For example, autonomous driving software may be deployed in various possible devices. For example, a subsystem is deployed in a terminal device such as an onboard terminal and a user terminal (including a smart phone and a tablet computer). The terminal device controls the autonomous driving vehicle 14 in FIG. 1 through wireless or wired communication with the vehicle, to implement an autonomous driving function of the autonomous driving vehicle 14. In another example, a subsystem is deployed in the server 13 in FIG. 1, and the server 13 controls the autonomous driving vehicle 14 through wireless communication between the base station 12 and the autonomous driving vehicle 14 in various manners, thereby implementing the autonomous driving function of the autonomous driving vehicle 14.

In some other embodiments, each subsystem in the autonomous driving system 100 shown in FIG. 1 may be packaged in a form of independent software, module, or plug-in and deployed in the foregoing device, or coupled with the autonomous driving software and autonomous navigation software pre-deployed in the foregoing device, to implement the autonomous driving function or some subfunctions of the autonomous driving function, such as trajectory planning.

The foregoing application scenario is illustrated merely for ease of understanding of the spirits and principles of the present disclosure, and the embodiments of the present disclosure are not limited in this aspect. On the contrary, the embodiments of the present disclosure can be applied to any applicable scenario.

Figure 3:
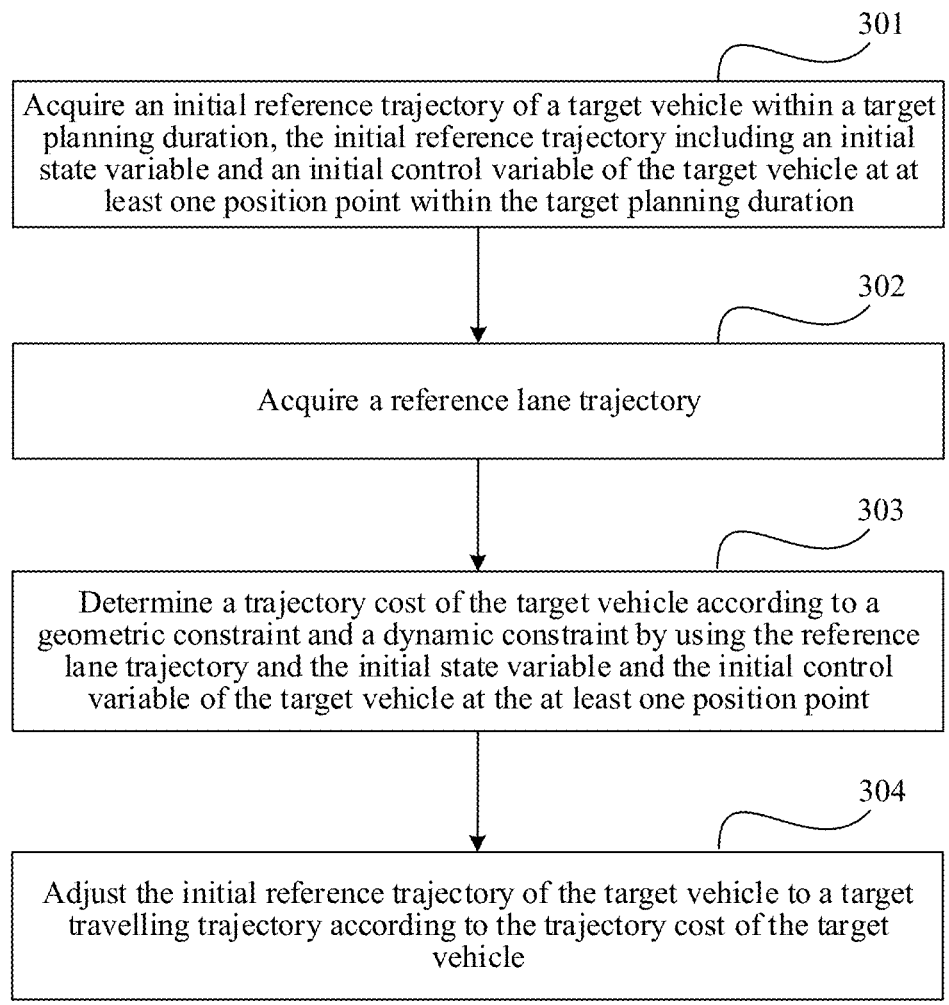
FIG. 3 is a flowchart of a vehicle trajectory planning method according to an embodiment of the present disclosure.

FIG. 3 shows a flowchart of a vehicle trajectory planning method according to an embodiment of the present disclosure. As shown in FIG. 3, the method is performed by an onboard terminal device, and includes the following steps:

Step S301: Acquire an initial reference trajectory of a target vehicle within a target planning duration, the initial reference trajectory including an initial state variable and an initial control variable of the target vehicle at least one position point within the target planning duration.

The target vehicle is an autonomous driving vehicle, and the target planning duration is a preset duration. For example, if the duration is set to 5 seconds and a quantity of planning steps is set to 20, each time step is $dt=T/N=0.25$ seconds. The time step herein is a duration between sampled position points.

In a specific implementation process, state variables include a position, a speed, an orientation angle, and the like, and control variables include an acceleration, an angular speed, and the like. In this embodiment of the present disclosure, the target vehicle is sampled according to a set time step within the target planning duration, and the initial state variable and the initial control variable of each position point are acquired. The position, the speed, the orientation, and the like are combined into a state vector, the acceleration and the angular speed are combined into a corresponding control vector, and the initial state variable and the initial control variable of each interval are further connected to form the initial reference trajectory.

For example, a duration of 5 s is equally divided into 20 intervals of 0.25 s, and each interval is sampled, so that a state of the target vehicle in each interval (including the position, the speed, the acceleration, and the like) can be obtained. The sampling herein may be sampling at the start of each interval, or sampling at an end of each interval, or sampling at a middle time point in each interval, as long as positions for sampling between different intervals remain consistent. For a same time point, the position, the speed, and the orientation are combined into an initial state vector, and the acceleration and the angular speed are combined into an initial control vector.

Step S302: Acquire a reference lane trajectory.

In a specific implementation process, the reference lane trajectory may be determined according to a start position and a target position of the target vehicle. Since a scenario where an obstacle exists is not considered in this embodiment of the present disclosure, a motor vehicle lane may be randomly selected on a path between the start position and the target position, or a suitable motor vehicle lane may be selected according to a position of the lane on the path. Generally, a centerline of the motor vehicle lane is used as the reference lane trajectory. Certainly, a sideline of the lane may also be used as the reference lane trajectory, which is not limited in this embodiment of the present disclosure.

Step S303: Determine a trajectory cost of the target vehicle according to a geometric constraint and a dynamics constraint by using the reference lane trajectory and the initial state variable and the initial control variable of the target vehicle at the at least one position point.

The dynamics constraint includes at least one of an energy loss, an acceleration constraint, or an angular speed constraint.

In the specific implementation process, after the reference lane trajectory is determined, the trajectory cost of the target vehicle may be determined according to each parameter of the reference lane trajectory. Specifically, corresponding geometric constraints and dynamics constraints are preset. The geometric constraints are constraints with respect to road geometries and vehicle geometries for the target vehicle, which may include a position constraint, a vehicle speed constraint, a heading angle constraint, and the like. In this way, the geometric constraint ensures that the target vehicle may travel from an origin to a destination according to a set path, and are properly applicable to lane keeping.

The dynamics constraints are constraints with respect to speed planning and dynamics for the target vehicle, which may include an energy loss, an acceleration constraint, an angular speed constraint, and the like, and may be properly applicable to complex nonlinear and dynamically changing driving scenarios, such as turning and lane changing, which can improve the stability and comfort of autonomous driving.

Step S304: Adjust the initial reference trajectory of the target vehicle to a target travelling trajectory according to the trajectory cost of the target vehicle.

In the specific implementation process, a reinforcement learning algorithm may be used for optimizing a trajectory according to the trajectory cost of the target vehicle by adjusting the initial reference trajectory of the target vehicle. The optimized trajectory is used as a new reference trajectory, and a plurality of iterations are performed until an iteration number reaches a threshold or the trajectory cost converges, so as to acquire the final optimized trajectory, which is the target travelling trajectory of the target vehicle.

The foregoing process is a trajectory optimization scheme of the target vehicle within a target planning duration. In order to guide the target vehicle to travel from the origin to the destination, the trajectories of the target vehicle within a plurality of target planning durations are required to be optimized. In the specific implementation process, the state variable and the control variable of the target vehicle at any position point except a first position point within a first target planning duration, that is, the state variable and the control variable in a first target travelling trajectory, may be used as the initial state variable and the initial control variable of the first position point within a second target planning duration, so as to obtain a target travelling trajectory of the target vehicle within the second target planning duration. Further, the state variable and the control variable of the target vehicle at any position point except a first position point within a second target planning duration, that is, the state variable and the control variable in a second target travelling trajectory, are used as the initial state variable and the initial control variable of the first position point within a third target planning duration, so as to obtain a target travelling trajectory of the target vehicle within the third target planning duration. By analogy, subsequent target travelling trajectories may be generated in sequence.

In this way, after a series of target driving trajectories of the target vehicle are connected, a continuous trajectory of the target vehicle from the start position to the target position may be formed. The target vehicle is guided to travel from the start position to the target position, so as to control the target vehicle to travel according to the target travelling trajectory.

In this embodiment of the present disclosure, the reference lane trajectory is acquired, and the initial reference trajectory of the target vehicle within the target planning duration is acquired. The initial reference trajectory includes an initial state variable and an initial control variable of the target vehicle at least one position point within the target planning duration. The trajectory cost of the target vehicle is determined according to a geometric constraint and a dynamics constraint by using the reference lane trajectory and the initial state variable and the initial control variable of the target vehicle at the at least one position point. The dynamics constraint includes at least one of an energy loss, an acceleration constraint, or an angular speed constraint. The initial reference trajectory of the target vehicle is adjusted to a target travelling trajectory according to the trajectory cost of the target vehicle. In this embodiment of the present disclosure, after the reference lane trajectory and the initial reference trajectory of the target vehicle are acquired, an optimizer index function is set based on the geometric constraint and the dynamics constraint, and the trajectory cost of the target vehicle is determined by using the reference lane trajectory and the initial state variable and the initial control variable of the target vehicle, so as to comprehensively deal with the problems of driving path planning and speed planning. Constraints with respect to road geometries and vehicle geometries are considered, and the dynamics constraint includes an energy loss, an acceleration constraint, and an angular speed constraint of a target vehicle, that is, feasibility of the vehicle trajectory planning under the dynamics constraint is considered. Therefore, the embodiments of the present disclosure are more adapted to the complex nonlinear and dynamically changing dynamics constraint during travelling of the vehicle, thereby improving the safety and stability of autonomous driving.

Further, in this embodiment of the present disclosure, the trajectory cost at each position point is determined according to the geometric constraint and the dynamics constraint. Step 303 of determining a trajectory cost of the target vehicle according to a geometric constraint and a dynamics constraint by using the reference lane trajectory and the initial state variable and the initial control variable of the target vehicle includes:

determining a geometric cost function sub-term of the target vehicle at each position point within the target planning duration according to the reference lane trajectory, the initial state variable of the target vehicle, and the geometric constraint; determining a dynamics cost function sub-term of the target vehicle at the position point according to the initial state variable and the initial control variable of the target vehicle and the dynamics constraint; and determining the trajectory cost of the target vehicle within the target planning duration according to at least one of the geometric cost function sub-term of each position point or the dynamics cost function sub-term of each position point within the target planning duration.

The geometric constraints are constraints with respect to road geometries and vehicle geometries for the target vehicle, which may include a position constraint, a vehicle speed constraint, a heading angle constraint, and the like. In this way, the geometric constraint ensures that the target vehicle may travel from an origin to a destination according to a set path, and are properly applicable to lane keeping.

The dynamics constraints are constraints with respect to speed planning and dynamics for the target vehicle, which may include an energy loss, an acceleration constraint, an angular speed constraint, and the like, and may be properly applicable to complex nonlinear and dynamically changing driving scenarios, such as turning and lane changing, which can improve the stability and comfort of autonomous driving, and also greatly improves the safety of the autonomous driving.

In this embodiment of the present disclosure, for each position point within the target planning duration, the geometric cost function sub-term and the dynamics cost function sub-term of the target vehicle are determined. Therefore, the trajectory cost of the target vehicle is obtained by weighting all geometric cost function sub-terms and all dynamics cost function sub-terms of the target vehicle within the target planning duration.

In this embodiment of the present disclosure, for the trajectory planning of the target vehicle, a dynamic model of the system is established and a key constraint and a cost function are designed, and finally an algorithm of an iterative linear quadratic regulator (iLQR) is used for solving the trajectory planning problem.

In the specific implementation process, the trajectory optimization algorithm of the iLQR is used for optimizing the trajectory of the target vehicle. The iLQR continuously optimizes an object function of the trajectory by iteratively using an LQR to obtain an optimal solution or a suboptimal solution that satisfies the constraint. The iLQR is suitable for dealing with complex problems of a nonlinear system, a nonlinear constraint, and a nonlinear object function. The purpose of simplifying and efficiently solving the complex nonlinear problem is achieved by locally linearizing the system and performing quadratic processing on the constraint and the object function.

Mathematically, the iLQR is generally configured to solve discrete-time finite-domain trajectory planning problems, which may be expressed by using the following equation:

$$x^*, a^* = \arg\min_{x,a}\left\{J(x,a) = \ell^f(x_N) + \sum_{k=0}^{N-1}\ell(x_k, u_k)\right\},\quad \text{(Formula 1)}$$

s.t. $x_{k+1} = f(x_k, u_k)$, $x_0 = x_{start}$, and $g(x_k, u_k) < 0$, $g^f(x_N) < 0$, $k = 0, 1, \ldots, N-1$.

$x_k$ is a system state vector of a $k^{th}$ step from a current moment, $x_{start}$ is a planned system state at a current moment, $u_k$ is a system control vector of a $k^{th}$ step from a current moment, $\ell$ and $\ell^f$ respectively represent a process cost and a final value cost, and $g$ and $g^f$ respectively represent a process constraint and a final value constraint. An optimization vector is defined as $x=[x_1, \ldots, x_N]$ and $u=[u_1, \ldots, u_{N-1}]$, $f(x_k, u_k)$ is a dynamic equation expressing a state change of a discrete system, and N is a maximum step number in the trajectory planning. For example, the N may be set to any integer from 10 to 20.

For ease of description, system parameters in the trajectory planning process in this embodiment of the present disclosure are first described.

A state vector $x=[p^x, p^y, v, \psi]^T$ of the target vehicle and a control vector $u=[a, r]^T$ are set, and a system dynamic equation is described by using the following equation:

$p^x_{k+1} = p^x_k + v_k * \cos \psi_k * dt$, $p^y_{k+1} = p^y_k + v_k * \sin \psi_k * dt$, $v_{k+1} = v_k + a_k * dt$, $\psi_{k+1} = \psi_k + r_k * dt$,  (Formula 2)

$p^x$, $p^y$ is coordinates of the target vehicle in the ground coordinate system, v represents a speed, $\psi$ is an orientation angle (yaw), a and r respectively represent an acceleration and an angular speed, and k represents a step number within the target planning duration. If it is assumed that the target planning duration is T=5 seconds and a number of planned steps is N=20, each time step is equal to dt=T/N=0.25 seconds.

The core of an RL algorithm is the design of a cost function. Since the iLQR algorithm cannot directly deal with the constraint function, constraint information is generally required to be converted to a cost function (a soft constraint), and the cost function is designed to meet the constraint. Each geometric cost function sub-term and each dynamics cost function sub-term in this embodiment of the present disclosure are specifically described below. It is to be understood that the geometric cost function sub-term and the dynamics cost function sub-terms below are examples without limitation. The trajectory cost of the target vehicle may be a weighted value of some of the following cost function sub-terms, or may be a weighted value of all of the cost function sub-terms.

In some embodiments, the determining a geometric cost function sub-term of the target vehicle at the position point according to the reference lane trajectory, the initial state variable of the target vehicle, and the geometric constraint includes:

determining a vehicle speed cost function sub-term of the target vehicle at the position point according to a target vehicle speed and a current vehicle speed of the target vehicle;

determining a reference trajectory deviation cost function sub-term of the target vehicle at the position point according to a current state variable of the target vehicle and a state variable on a reference trajectory at a current moment; and determining a reference lane deviation cost function sub-term of the target vehicle at the position point according to the reference lane trajectory and current position coordinates of the target vehicle.

In the specific implementation process, the geometric cost function sub-term includes the vehicle speed cost function sub-term, the reference trajectory deviation cost function sub-term, and the reference lane deviation cost function sub-term.

The vehicle speed cost function sub-term is configured to control the vehicle speed of the target vehicle. For example, different paths correspond to different speed limits, and the vehicle speed of the target vehicle is required to be limited below a maximum speed limit of a driving lane without considering interference. In another example, in a car-following scenario, the vehicle speed of the target vehicle may be limited according to the speed of the leading vehicle and a following distance. In some embodiments, the determining a vehicle speed cost function sub-term of the target vehicle at the position point according to a target vehicle speed and a current vehicle speed of the target vehicle includes:

calculating a difference between the target vehicle speed and the current vehicle speed; and calculating the vehicle speed cost function sub-term of the target vehicle at the position point by using a vehicle speed cost function weight and the difference between the target vehicle speed and the current vehicle speed.

The specific vehicle speed cost function sub-term is shown in the following equation:

$$\ell_v = w_1 * (v - v_{target})^2 \quad \text{(Formula 3)}$$

$\ell_v$ represents the vehicle speed cost function sub-term, $w_1$ represents a weight corresponding to the vehicle speed cost function sub-term, v represents the current vehicle speed of the target vehicle, and $v_{target}$ represents the target vehicle speed, which may be provided by an upstream decision module, or may be designed according to the speed of the leading vehicle, the following distance, and the lane speed limit. An adjustment to $w_1$ mainly affects the amplitude of acceleration and deceleration of the target vehicle.

Figure 4:
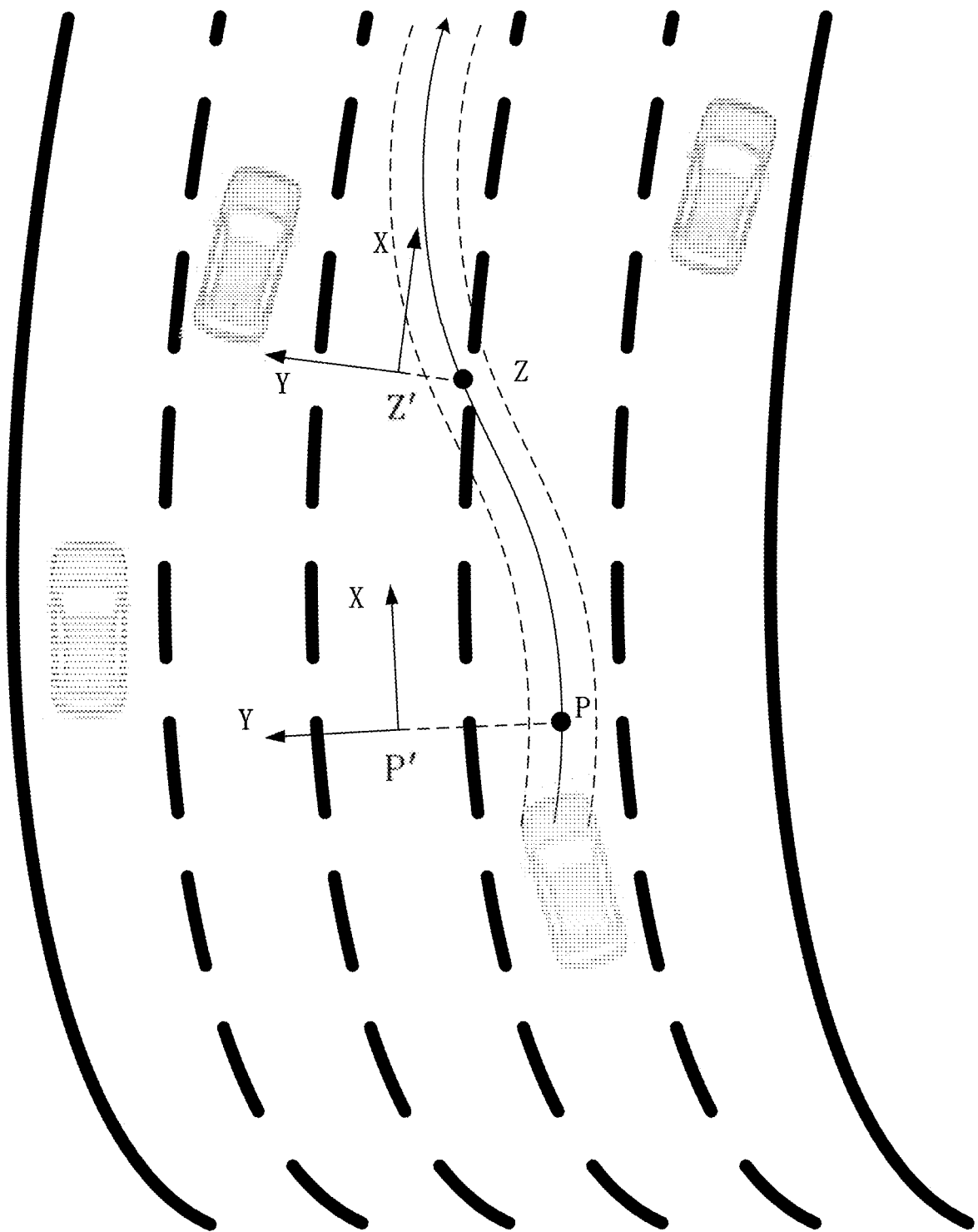
FIG. 4 is a schematic diagram of a reference point of a planned trajectory according to an embodiment of the present disclosure.

The reference trajectory deviation cost function sub-term is configured to control a deviation error from the reference trajectory, which is essentially to adjust a search range of the algorithm around the reference trajectory. As shown in FIG. 4, an area inside dashed lines in the figure is the search range of the algorithm. Generally, a larger weight of the reference trajectory deviation cost function sub-term leads to a smaller search range.

In some embodiments, the determining a reference trajectory deviation cost function sub-term of the target vehicle at the position point according to a current state variable of the target vehicle and a state variable on a reference trajectory at a current moment includes:

calculating a difference between the current state variable of the target vehicle and the state variable on the reference trajectory at the current moment; and calculating a reference trajectory deviation cost function sub-term of the target vehicle at the position point by using a reference trajectory deviation cost function weight and the difference between the current state variable of the target vehicle and the state variable on the reference trajectory at the current moment;

Specifically, the reference trajectory deviation cost function sub-term is shown in the following equation:

$$\ell_{x_{ref}} = w_2 * (x - x_{ref})^T Q_2 (x - x_{ref}) \quad \text{(Formula 4)}$$

$\ell_{x_{ref}}$ represents the reference trajectory deviation cost function sub-term, $w_2$ represents the weight of the reference trajectory deviation cost function sub-term, $Q_2$ is a coefficient, $x$ represents the current state variable of the target vehicle, and $x_{ref}$ represents the state variable on the reference trajectory at the current moment. $w_2$ and $Q_2$ are designed, which is essentially to adjust the search range of the iLQR around the reference trajectory.

The reference lane deviation cost function sub-term is configured to control the deviation error from the reference lane trajectory. As shown in FIG. 4, a point P and a point Z in the figure are points on the reference trajectory of the target vehicle, a point P' is a reference point of the point P on the reference lane trajectory, and a point Z' is a reference point of the point Z on the reference lane trajectory. The reference lane deviation cost function sub-term is configured to control a distance between the point P and the point P' a distance between the point Z and the point Z'.

In some embodiments, the determining a reference lane deviation cost function sub-term of the target vehicle at the position point according to the reference lane trajectory and current position coordinates of the target vehicle includes:

determining reference position coordinates of the target vehicle, a reference position of the target vehicle being a position on the reference lane trajectory corresponding to a current position of the target vehicle; and calculating the reference lane deviation cost function sub-term of the target vehicle at the position point by using a reference lane deviation cost function weight and the current position coordinates and the reference position coordinates of the target vehicle.

Specifically, the reference lane deviation cost function sub-term is shown in the following equation:

$$\ell_{center} = w_4 * (C_x - M_{ref})^T Q_4 (C_x - M_{ref}) \quad \text{(Formula 5)}$$

$\ell_{center}$ represents the reference lane deviation cost function sub-term, $w_4$ represents the weight of the reference lane deviation cost function sub-term, $Q_4$ is a coefficient, and $M_{ref}$ represents a reference point of a trajectory point $(p^x, p^y)$ on the road coordinate system (a Frenet coordinate system), that is, a point closest to $(p^x, p^y)$ on a centerline of the lane. C can be a matrix $$C = \begin{bmatrix} 1 & 0 & 0 & 0 \\ 0 & 1 & 0 & 0 \end{bmatrix}.$$

In the Frenet coordinate system, an s axis naturally extends along a direction of a road reference line (for example, a road centerline γ), which implies the change in a road direction, while coordinates of an l axis may represent a distance from the road reference line.

In this embodiment of the present disclosure, the amplitude of the acceleration and deceleration of the target vehicle may be adjusted by determining the geometric cost function sub-term of the target vehicle at each position point, and a relatively smooth vehicle trajectory can be planned for the target vehicle, so as to realize the stable, comfortable, and safe travelling of the target vehicle under different road conditions.

In some embodiments, the determining a dynamics cost function sub-term of the target vehicle at the position point according to the initial state variable and the initial control variable of the target vehicle and the dynamics constraint includes:

determining an energy loss cost function sub-term of the target vehicle at the position point according to a current control variable of the target vehicle;

determining an acceleration cost function sub-term of the target vehicle at the position point according to an acceleration constraint and a current acceleration of the target vehicle; and determining an angular speed cost function sub-term of the target vehicle at the position point according to an angular speed constraint and a current angular speed of the target vehicle.

In the specific implementation process, the dynamics cost function sub-term includes an energy loss cost function sub-term, an acceleration cost function sub-term, and an angular speed cost function sub-term.

The energy loss cost function sub-term is configured to control the trajectory smoothness of the target vehicle, and the current control variable of the target vehicle includes the current acceleration and the current angular speed of the target vehicle. The determining an energy loss cost function sub-term of the target vehicle at the position point according to the current control variable of the target vehicle includes:

calculating the energy loss cost function sub-term of the target vehicle at the position point by using an energy loss cost function weight and the current acceleration and the current angular speed of the target vehicle.

Specifically, the energy loss cost function sub-term is shown in the following equation:

$$\ell_u = w_3 * u^T R_3 u \quad \text{(Formula 6)}$$

$\ell_u$ represents the energy loss cost function sub-term, $w_3$ represents the weight of the energy loss cost function sub-term, $R_3$ is a coefficient, and the designed $w_3$ and $R_3$ directly affect the smoothness of the trajectory and the smoothness of the control signal. Generally, $w_3$ and $R_3$ are designed as relatively large values to increase the smoothness of the trajectory.

The acceleration cost function sub-term is configured to control the acceleration of the target vehicle. The determining an acceleration cost function sub-term of the target vehicle at the position point according to an acceleration constraint and a current acceleration of the target vehicle includes:

determining a maximum acceleration and a minimum acceleration; and determining the acceleration cost function sub-term of the target vehicle at the position point according to a difference between the maximum acceleration and the current acceleration of the target vehicle, a difference between the current acceleration of the target vehicle and the minimum acceleration, and the acceleration constraint.

Since the acceleration constraint is $a_{min} \leq a \leq a_{max}$, $a_{min}$ and $a_{max}$ being respectively a minimum design acceleration and a maximum design acceleration, the acceleration cost function sub-term is set as shown in the following equation:

$$\begin{cases} \ell_{acc1} = q_1 \exp(q_2 * (Du - a_{max})) \\ \ell_{acc2} = q_1 \exp(q_2 * (a_{max} - Du)) \end{cases} \quad \text{(Formula 7)}$$

$\ell_{acc1}$ and $\ell_{acc2}$ represent acceleration cost function sub-terms, $q_1$ and $q_2$ represent coefficients of the acceleration cost function sub-terms, and $D=[1\ 0]$.

The angular speed cost function sub-term is configured to control a yaw speed of the target vehicle. The determining an angular speed cost function sub-term of the target vehicle at the position point according to an angular speed constraint and a current angular speed of the target vehicle includes:

determining a maximum angular speed and a minimum angular speed according to a road adhesion coefficient; and determining the angular speed cost function sub-term of the target vehicle at the position point according to a difference between the maximum angular speed and the current angular speed of the target vehicle, a difference between the current angular speed of the target vehicle and the minimum angular speed, and the angular speed constraint.

Since the yaw speed constraint is $r_{min} \leq r \leq r_{max}$, $r_{min}$ and $r_{max}$ being respectively a minimum design angular velocity and a maximum design angular velocity, the angular speed cost function sub-term is set as shown in the following equation:

$$\begin{cases} \ell_{r1} = q_1 \exp(q_2 * (Eu - r_{max})) \\ \ell_{r2} = q_1 \exp(q_2 * (r_{max} - Eu)) \end{cases} \quad \text{(Formula 8)}$$

$\ell_{r1}$ and $\ell_{r2}$ represent angular speed cost function sub-terms, $q_1$ and $q_2$ represent coefficients of the angular speed cost function sub-terms, and $E=[0\ 1]$. Since values of $r_{min}$ and $r_{max}$ affect the feasibility of the planned trajectory, in this embodiment of the present disclosure, $r_{min}$ and $r_{max}$ are set as follows:

$$\begin{cases} r_{max} = a^y_{lim}/v \\ r_{min} = -a^y_{lim}/v \end{cases} \quad \text{(Formula 9)}$$

$a^y_{lim}$ is a set maximum lateral acceleration. Assuming that the road adhesion coefficient is $\mu$, $a^y_{lim}$ may be designed as $$a^y_{lim} = \begin{cases} \max(\alpha \sqrt{\mu^2 g^2 - a_{max}^2}, 0.1g) & \text{if } \mu g > a_{max} \\ 0.1g & \text{otherwise} \end{cases},$$

g being a gravitational acceleration that is a constant, and a being a designable coefficient.

In this embodiment of the present disclosure, the stability of the dynamic trajectory planning can be improved by determining the dynamics cost function sub-term of the target vehicle at each position point, so that the problems of the feasibility and safety of the planned vehicle trajectory under the dynamics constraint are solved, and the target vehicle can travel stably, comfortably, and safely under different road conditions.

In the foregoing process, the geometric cost function sub-term and the dynamics cost function sub-term are set. In this embodiment of the present disclosure, the trajectory cost of the target vehicle within the target planning duration is determined according to all of the geometric cost function sub-terms and all of the dynamics cost function sub-terms within the target planning duration. The trajectory cost function is a weighted value of all sub-terms. For details, reference may be made to the following equation:

$$\ell = \ell_v + \ell_{x_{ref}} + \ell_u + \ell_{center} + \ell_{acc1} + \ell_{acc2} + \ell_{r1} + \ell_{r2} \quad \text{(Formula 10)}$$

$\ell$ represents a trajectory cost function, and each term on the right of the equation is a cost function sub-term.

Preferably, the cost function sub-term includes a corresponding cost function weight, the cost function weight being a time-varying parameter corresponding to a position point within the target planning duration.

Generally, with an increased planning distance and the weakened environment sensing ability, the corresponding cost function becomes less important. Weights $w_1, \ldots, w_4$ may be designed as the time-varying parameter, such as $w_1 = 1000 * \exp(-0.5 * k * dt)$, k being a currently planned step number ($0 \leq k < N$), and dt being a time step. Such time-varying weights are beneficial to enhance the stability of trajectory planning and reduce the interference of unreliable information.

Further, a final value error is further required to be set in the trajectory cost function to ensure the validity of an end state of the planned trajectory. The determining the trajectory cost of the target vehicle within the target planning duration according to at least one of the geometric cost function sub-term of each position point or the dynamics cost function sub-term of each position point within the target planning duration further includes:

determining a final step error sub-term of the target vehicle within the target planning duration according to a target state of the target vehicle and an initial state variable of the target vehicle at a last position point within the target planning duration; and determining the trajectory cost of the target vehicle within the target planning duration according to the geometric cost function sub-term of each position point and the dynamics cost function sub-term of each position point within the target planning duration and the final step error sub-term.

The final step error sub-term herein may also be referred to as the final value error sub-term, which is configured to ensure that the validity of the end state of the vehicle trajectory is enhanced. By determining the final step error sub-term within the target planning duration, the correctness of the speed and the direction of the target vehicle in the end state of the planned vehicle trajectory can be ensured, thereby ensuring the safe driving of the target vehicle.

In the specific implementation process, since the speed and the direction in the end state are relatively important, the final step error sub-term in this embodiment of the present disclosure is as follows:

$$\ell_f = w_7 * (x_N - x_{target})^T Q_7 (x_N - x_{target}) \quad \text{(Formula 11)}$$

$\ell^f$ represents the final step error sub-term, $w_7$ represents the weight of the final step error sub-term, $x_N$ represents the state variable of the target vehicle in an $N^{th}$ step, that is, at a last position point within the target planning duration, and $x_{target}$ represents the target state.

Therefore, after the final step error sub-term is considered, the trajectory cost function in this embodiment of the present disclosure is as follows:

$$\ell = \ell_y + \ell_{x_{ref}} + \ell_u + \ell_{center} + \ell_{acc1} + \ell_{acc2} + \ell_{r1} + \ell_{r2} + \ell_f \quad \text{(Formula 12)}$$

In this way, the modeling for optimization problems is completed, and the optimization problems can be solved by using the RL algorithm. In this embodiment of the present disclosure, the iLQR algorithm is used for solving. In this case, the adjusting the initial reference trajectory of the target vehicle to a target travelling trajectory according to the trajectory cost of the target vehicle includes:

reversely calculating an optimal control rate of each position point starting from a last position point within the target planning duration according to the trajectory cost;

successively adjusting the state variable and the control variable of the target vehicle according to the optimal control rate; and updating the trajectory cost of the target vehicle according to a current state variable and a current control variable of the target vehicle, and reversely recalculating the optimal control rate until a set iteration end condition is satisfied, to obtain the target travelling trajectory.

Figure 5:
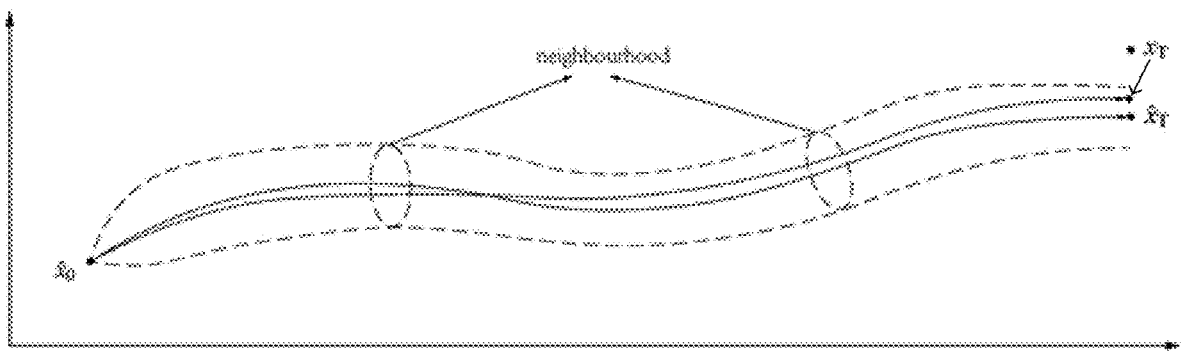
FIG. 5 is a schematic diagram of single trajectory optimization according to an embodiment of the present disclosure.

In the specific implementation process, a single execution process of the iLQR is described in FIG. 5. Given the reference trajectories $\hat{x}_0, \ldots,$ and $\hat{x}_T$ at the current moment, the iLQR first performs a reverse transfer process. Starting from $\hat{x}_T$, by optimizing the object function J(x, u), that is, the foregoing trajectory cost function $\ell$, the optimal control rate of each step from a moment T−1 to a moment 0 is calculated. Then a forward transfer process is performed, and starting from the initial state $\hat{x}_0$, the optimal control rate obtained by using the reverse process is gradually iterated forward to a moment T, so as to obtain the optimized trajectories $\hat{x}_0, \ldots,$ and $x_T$.

The foregoing process is repeated continuously, the optimized trajectory is used as a new reference trajectory, and a plurality of LQR iterations are performed until the final optimized trajectory is obtained.

Figure 6:
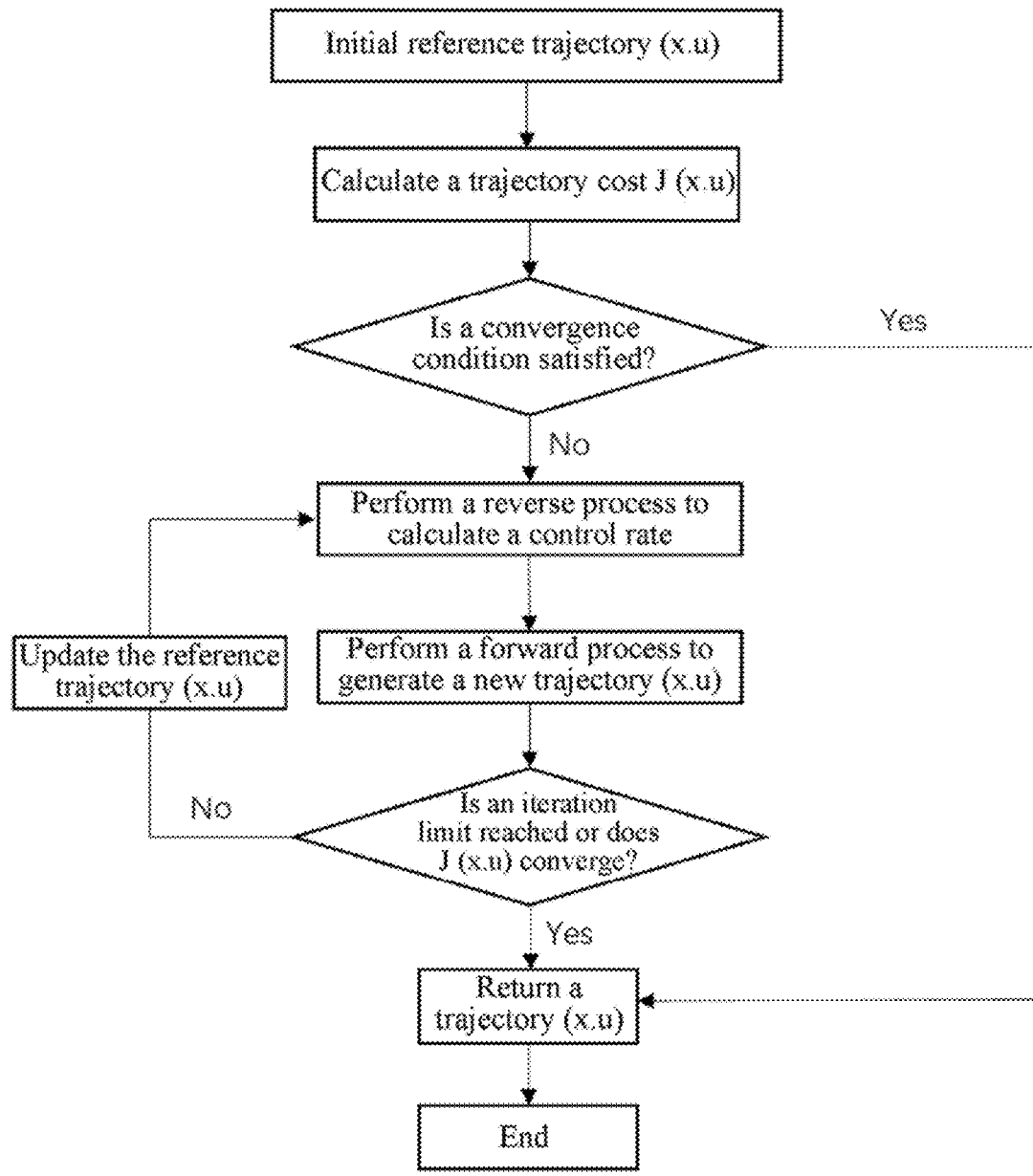
FIG. 6 is a schematic flowchart of a vehicle trajectory planning method according to a specific embodiment of the present disclosure.

The implementation process of the vehicle trajectory planning method based on the iLQR provided in this embodiment of the present disclosure is described below by using a specific example. FIG. 6 shows a schematic flowchart of a vehicle trajectory planning method. As shown in FIG. 6, the vehicle trajectory planning method provided in this embodiment of the present disclosure includes:

acquiring an initial reference trajectory of a target vehicle within a target planning duration, and a reference lane trajectory, the initial reference trajectory including an initial state variable and an initial control variable of the target vehicle at each step within the target planning duration.

calculating a trajectory cost J(x, u) of the target vehicle according to a geometric constraint and a dynamics constraint by using the reference lane trajectory and the initial state variable and the initial control variable of the target vehicle, the geometric constraint including a position constraint, a vehicle speed constraint, and a yaw angle constraint, and the dynamics constraint including an energy loss, an acceleration constraint, and an angular speed constraint;

determining, according to the trajectory cost of the target vehicle, whether a convergence condition is satisfied, if so, outputting a target travelling trajectory, and if not, performing the reverse process and calculating an optimal control rate at each step from a moment T−1 to a moment 0 by using the trajectory cost, that is, an objective function J(x, u);

performing a forward transfer process, performing a forward process from an initial state, and gradually iterating forward, to a moment T, the optimal control rate obtained by using the reverse process, so as to obtain an optimized new trajectory; and determining whether an iteration number has been reached or whether the object function J(x, u) converges, if so, outputting the target travelling trajectory, if not, using the optimized new trajectory as a reference trajectory, and repeatedly performing the reverse process to calculate the control rate.

The following describes apparatus embodiments of the present disclosure. For details not described in the apparatus embodiments, refer to the foregoing method embodiments that are in a one-to-one correspondence with the apparatus embodiments.

Figure 7:
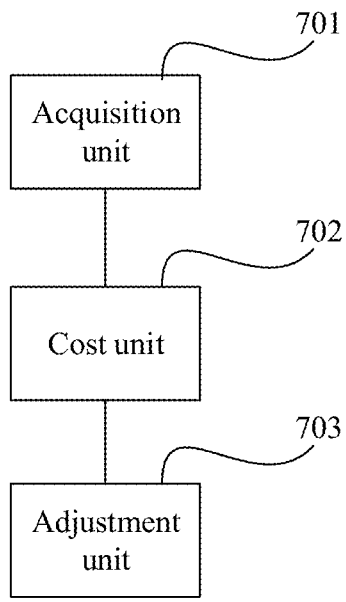
FIG. 7 is a schematic structural diagram of a vehicle trajectory planning apparatus according to an embodiment of the present disclosure.

FIG. 7 shows a structural block diagram of a vehicle trajectory planning apparatus according to an embodiment of the present disclosure. The vehicle trajectory planning apparatus is implemented by hardware or a combination of software and hardware to become all or a part of the onboard terminal device in FIG. 1. The apparatus includes:

an acquisition unit 701, configured to acquire an initial reference trajectory of a target vehicle within a target planning duration, the initial reference trajectory including an initial state variable and an initial control variable of the target vehicle at at least one position point within the target planning duration;

the acquisition unit 701 being further configured to acquire a reference lane trajectory;

a cost unit 702, configured to determine a trajectory cost of the target vehicle according to a geometric constraint and a dynamics constraint by using the reference lane trajectory and the initial state variable and the initial control variable of the target vehicle at the at least one position point, the dynamics constraint including at least one of an energy loss, an acceleration constraint, or an angular speed constraint; and an adjustment unit 703, configured to adjust the initial reference trajectory of the target vehicle to a target travelling trajectory according to the trajectory cost of the target vehicle.

In some embodiments, the cost unit 702 is configured to:

determine a geometric cost function sub-term of the target vehicle at each position point within the target planning duration according to the reference lane trajectory, the initial state variable of the target vehicle, and the geometric constraint; determine a dynamics cost function sub-term of the target vehicle at the position point according to the initial state variable, the initial control variable, and the dynamics constraint of the target vehicle; and determine the trajectory cost of the target vehicle within the target planning duration according to at least one of the geometric cost function sub-term of each position point or the dynamics cost function sub-term of each position point within the target planning duration.

In some embodiments, the cost unit 702 is further configured to:
- determine a final step error sub-term of the target vehicle within the target planning duration according to a target state of the target vehicle and an initial state variable of the target vehicle at a last position point within the target planning duration; and
- determine the trajectory cost of the target vehicle within the target planning duration according to the geometric cost function sub-term of each position point and the dynamics cost function sub-term of each position point within the target planning duration and the final step error sub-term.

In some embodiments, the cost function sub-term includes a corresponding cost function weight, the cost function weight being a time-varying parameter corresponding to a position point within the target planning duration.

In some embodiments, the cost unit 702 is further configured to:
- determine a vehicle speed cost function sub-term of the target vehicle at the position point according to a target vehicle speed and a current vehicle speed of the target vehicle;
- determine a reference trajectory deviation cost function sub-term of the target vehicle at the position point according to a current state variable of the target vehicle and a state variable on a reference trajectory at a current moment; and
- determine a reference lane deviation cost function sub-term of the target vehicle at the position point according to the reference lane trajectory and current position coordinates of the target vehicle.

In some embodiments, the cost unit 702 is further configured to:
- calculate a difference between the target vehicle speed and the current vehicle speed; and
- calculate the vehicle speed cost function sub-term of the target vehicle at the position point by using a vehicle speed cost function weight and the difference between the target vehicle speed and the current vehicle speed;
- calculate a difference between the current state variable of the target vehicle and the state variable on the reference trajectory at the current moment;
- calculate a reference trajectory deviation cost function sub-term of the target vehicle at the position point by using a reference trajectory deviation cost function weight and the difference between the current state variable of the target vehicle and the state variable on the reference trajectory at the current moment;
- determine reference position coordinates of the target vehicle, a reference position of the target vehicle being a position on the reference lane trajectory corresponding to a current position of the target vehicle; and
- calculate the reference lane deviation cost function sub-term of the target vehicle at the position point by using a reference lane deviation cost function weight and the current position coordinates and the reference position coordinates of the target vehicle.

In some embodiments, the cost unit 702 is further configured to:
- determine an energy loss cost function sub-term of the target vehicle at the position point according to a current control variable of the target vehicle;
- determine an acceleration cost function sub-term of the target vehicle at the position point according to an acceleration constraint and a current acceleration of the target vehicle; and
- determine an angular speed cost function sub-term of the target vehicle at the position point according to an angular speed constraint and a current angular speed of the target vehicle.

In some embodiments, the current control variable of the target vehicle includes the current acceleration and the current angular speed of the target vehicle.

The cost unit 702 is further configured to:
- calculate the energy loss cost function sub-term of the target vehicle at the position point by using an energy loss cost function weight and the current acceleration and the current angular speed of the target vehicle;
- determine a maximum acceleration and a minimum acceleration; and
- determine the acceleration cost function sub-term of the target vehicle at the position point according to a difference between the maximum acceleration and the current acceleration of the target vehicle, a difference between the current acceleration of the target vehicle and the minimum acceleration, and the acceleration constraint;
- determine a maximum angular speed and a minimum angular speed according to a road adhesion coefficient; and
- determine the angular speed cost function sub-term of the target vehicle at the position point according to a difference between the maximum angular speed and the current angular speed of the target vehicle, a difference between the current angular speed of the target vehicle and the minimum angular speed, and the angular speed constraint.

In some embodiments, the adjustment unit 703 is further configured to:
- reversely calculate an optimal control rate of each step from a last step to a first step of the target planning duration according to the trajectory cost;
- successively adjust the state variable and the control variable of the target vehicle from the first step to the last step of the target planning duration according to the optimal control rate; and
- update the trajectory cost of the target vehicle according to a current state variable and a current control variable of the target vehicle, and reversely recalculate the optimal control rate until a set iteration end condition is satisfied, to obtain the target travelling trajectory.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Corresponding to the foregoing method embodiment, an embodiment of the present disclosure further provides an electronic device. The electronic device may be a terminal device, such as an onboard terminal device shown in FIG. 1, or may be an electronic device such as a smart phone, a tablet computer, a portable computer, or a computer. The electronic device includes at least a memory configured to store data and a processor configured to process the data. For the processor configured to process the data, the processing may be implemented by using a microprocessor, a CPU, a graphics processing unit (GPU), a DSP, or an FPGA. For the memory, an operation instruction is stored in the memory. The operation instruction may be a computer executable code, and each step in the flow of the vehicle trajectory planning method in this embodiment of the present disclosure is implemented through the operation instruction.

Figure 8:
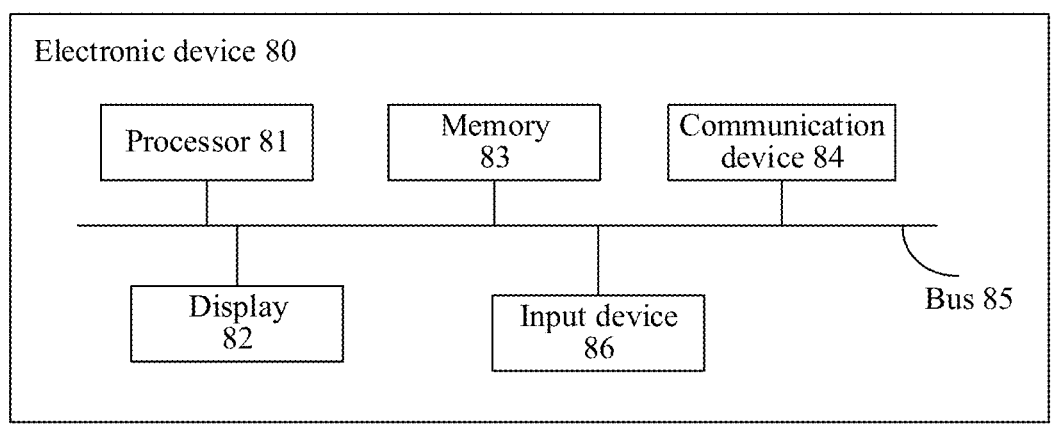
FIG. 8 is a schematic structural diagram of an electronic device according to an embodiment of the present disclosure.

FIG. 8 is a schematic structural diagram of an electronic device according to an embodiment of the present disclosure. As shown in FIG. 8, the electronic device 80 in this embodiment of the present disclosure includes a processor 81, a display 82, a memory 83, an input device 86, a bus 85, and a communication device 84. The processor 81, the memory 83, the input device 86, the display 82, and the communication device 84 are all connected by the bus 85. The bus 85 is configured to transmit data among the processor 81, the memory 83, the display 82, the communication device 84, and the input device 86.

The memory 83 may be configured to store a software program and module, such as a program instruction/module corresponding to the vehicle trajectory planning method in the embodiments of the present disclosure. The processor 81 runs the software program and module stored in the memory 83, so as to execute various function applications and data processing of the electronic device 80, such as the vehicle trajectory planning method provided in the embodiments of the present disclosure. The memory 83 may mainly include a program storage area and a data storage area. The program storage area may store an operating system, an application program required by at least one application, or the like. The data storage area may store data (for example, an animation clip, and a control policy network) and the like created according to use of the electronic device 80. In addition, the memory 83 may include a high speed RAM, and may further include a non-volatile memory, such as at least one magnetic disk storage device, a flash memory, or another volatile solid storage device.

The processor 81 is a control center of the electronic device 80, and connects to various parts of the electronic device 80 by using the bus 85 and various interfaces and lines. By running or executing the software program and/or the module stored in the memory 83, and invoking data stored in the memory 83, the processor 80 performs various functions and data processing of the electronic device 80. In some embodiments, the processor 81 may include one or more processing units, such as a CPU, a GPU, a digital processing unit, and the like.

In this embodiment of the present disclosure, the processor 81 displays a generated animation clip to a user through the display 82.

The processor 81 may further be connected to the network through the communication device 84. If the electronic device is a terminal device, the processor 81 may transmit data with a game server through the communication device 84. If the electronic device is the game server, the processor 81 may transmit data with the terminal device through the communication device 84.

The input device 86 is mainly configured to obtain an input operation of the user. The input device 86 varies with the electronic device. For example, when the electronic device is a computer, the input device 86 may be an input device such as a mouse, a keyboard, or the like, and when the electronic device is a portable device such as a smart phone or a tablet computer, the input device 86 may be a touch screen.

An embodiment of the present disclosure further provides a computer storage medium, storing computer executable instructions, the computer executable instructions being used for implementing the vehicle trajectory planning method in any embodiment of the present disclosure.

In some embodiments, each aspect of the vehicle trajectory planning method provided in the present disclosure may be further implemented in a form of a program product including program code. When the program product is run on a computer device, the program code is used to enable the computer device to perform steps of the vehicle trajectory planning method according to the various exemplary implementations of the present disclosure described above in the specification. For example, the computer device can execute an animation generation process in steps S301 to S306 as shown in FIG. 3.

The program product may use any combination of one or more readable media. The readable medium may be a readable signal medium or a readable storage medium. The readable storage medium may be, for example but not limited to, an electrical, magnetic, optical, electromagnetic, infrared, or semiconductor system, apparatus, or device, or any combination thereof. More specific examples (a non-exhaustive list) of the readable storage medium include: an electrical connection with one or more wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any appropriate combination thereof.

The readable signal medium may include a data signal propagated in a baseband or as part of a carrier, and stores computer-readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program configured to be used by or in combination with an instruction execution system, apparatus, or device.

In the several embodiments provided in the present disclosure, it is to be understood that the disclosed device and method may be implemented in other manners. The described device embodiment is merely an example. For example, the unit division is merely logical function division and may be other division during actual implementation. For example, a plurality of units or components may be combined, or integrated into another system, or some features may be omitted or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may comprise alone physically, or two or more units are integrated into one unit. The integrated unit may be implemented in a form of hardware, or may be implemented in a form of hardware in addition to a software functional unit.

The foregoing descriptions are merely a specific implementation of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A vehicle trajectory planning method, comprising:
acquiring an initial reference trajectory of a target vehicle within a target planning duration, the initial reference trajectory comprising an initial state variable and an initial control variable of the target vehicle at at least one position point within the target planning duration;
acquiring a reference lane trajectory;
for each position point in the target planning duration:
determining a geometric cost function sub-term of the target vehicle at the position point according to the reference lane trajectory, the initial state variable of the target vehicle, and a geometric constraint, and determining a dynamics cost function sub-term of the target vehicle at the position point according to the initial state variable and the initial control variable of the target vehicle and a dynamics constraint, the dynamics constraint comprising at least one of an energy loss, an acceleration constraint, or an angular speed constraint;
determining a trajectory cost of the target vehicle for at least one reference trajectory within the target planning duration according to at least one of the geometric cost function sub-terms of position points or the dynamics cost function sub-terms of the position points within the target planning duration, the at least one reference trajectory comprising the initial reference trajectory; and
controlling the target vehicle to adjust from the initial reference trajectory of the target vehicle to a target travelling trajectory according to the trajectory cost of the target vehicle, wherein the controlling the target vehicle to adjust from the initial reference trajectory of the target vehicle to the target travelling trajectory according to the trajectory cost of the target vehicle comprises:
reversely calculating an optimal control rate of position points starting from a last position point within the target planning duration according to the trajectory cost;
successively adjusting a state variable and a control variable of the target vehicle according to the optimal control rate; and
updating the trajectory cost of the target vehicle according to a current state variable and a current control variable of the target vehicle, and reversely recalculating the optimal control rate until a set iteration end condition is satisfied, to obtain the target travelling trajectory.

2. The method according to claim 1, wherein the determining the trajectory cost of the target vehicle within the target planning duration according to at least one of the geometric cost function sub-terms of position points or the dynamics cost function sub-terms of the position points within the target planning duration further comprises:
determining a final step error sub-term of the target vehicle within the target planning duration according to a target state of the target vehicle and an initial state variable of the target vehicle at a last position point within the target planning duration; and
determining the trajectory cost of the target vehicle within the target planning duration according to the geometric cost function sub-terms of the position points and the dynamics cost function sub-terms of the position points within the target planning duration and the final step error sub-term.

3. The method according to claim 1, wherein the determining the geometric cost function sub-term of the target vehicle at the position point according to the reference lane trajectory, the initial state variable of the target vehicle, and the geometric constraint comprises:
determining a vehicle speed cost function sub-term of the target vehicle at the position point according to a target vehicle speed and a current vehicle speed of the target vehicle;
determining a reference trajectory deviation cost function sub-term of the target vehicle at the position point according to a current state variable of the target vehicle and a state variable on a reference trajectory at a current moment; and
determining a reference lane deviation cost function sub-term of the target vehicle at the position point according to the reference lane trajectory and current position coordinates of the target vehicle.

4. The method according to claim 3, wherein the determining a vehicle speed cost function sub-term of the target vehicle at the position point according to a target vehicle speed and a current vehicle speed of the target vehicle comprises:
calculating a difference between the target vehicle speed and the current vehicle speed; and
calculating the vehicle speed cost function sub-term of the target vehicle at the position point by using a vehicle speed cost function weight and the difference between the target vehicle speed and the current vehicle speed;
the determining a reference trajectory deviation cost function sub-term of the target vehicle at the position point according to a current state variable of the target vehicle and a state variable on a reference trajectory at a current moment comprises:
calculating a difference between the current state variable of the target vehicle and the state variable on the reference trajectory at the current moment; and
calculating a reference trajectory deviation cost function sub-term of the target vehicle at the position point by using a reference trajectory deviation cost function weight and the difference between the current state variable of the target vehicle and the state variable on the reference trajectory at the current moment; and
the determining a reference lane deviation cost function sub-term of the target vehicle at the position point according to the reference lane trajectory and current position coordinates of the target vehicle comprises:
determining reference position coordinates of the target vehicle, a reference position of the target vehicle being a position on the reference lane trajectory corresponding to a current position of the target vehicle; and
calculating the reference lane deviation cost function sub-term of the target vehicle at the position point by using a reference lane deviation cost function weight and the current position coordinates and the reference position coordinates of the target vehicle.

5. The method according to claim 1, wherein the determining the dynamics cost function sub-term of the target vehicle at the position point according to the initial state variable and the initial control variable of the target vehicle and the dynamics constraint comprises:

determining an energy loss cost function sub-term of the target vehicle at the position point according to a current control variable of the target vehicle;

determining an acceleration cost function sub-term of the target vehicle at the position point according to an acceleration constraint and a current acceleration of the target vehicle; and determining an angular speed cost function sub-term of the target vehicle at the position point according to an angular speed constraint and a current angular speed of the target vehicle.

6. The method according to claim 5, wherein the current control variable of the target vehicle comprises the current acceleration and the current angular speed of the target vehicle; and the determining an energy loss cost function sub-term of the target vehicle at the position point according to a current control variable of the target vehicle comprises:

calculating the energy loss cost function sub-term of the target vehicle at the position point by using an energy loss cost function weight and the current acceleration and the current angular speed of the target vehicle;

the determining an acceleration cost function sub-term of the target vehicle at the position point according to an acceleration constraint and a current acceleration of the target vehicle comprises:

determining a maximum acceleration and a minimum acceleration;

determining the acceleration cost function sub-term of the target vehicle at the position point according to a difference between the maximum acceleration and the current acceleration of the target vehicle, a difference between the current acceleration of the target vehicle and the minimum acceleration, and the acceleration constraint; and the determining an angular speed cost function sub-term of the target vehicle at the position point according to an angular speed constraint and a current angular speed of the target vehicle comprises:

determining a maximum angular speed and a minimum angular speed according to a road adhesion coefficient; and determining the angular speed cost function sub-term of the target vehicle at the position point according to a difference between the maximum angular speed and the current angular speed of the target vehicle, a difference between the current angular speed of the target vehicle and the minimum angular speed, and the angular speed constraint.

7. The method according to claim 1, wherein the cost function sub-term comprises a corresponding cost function weight, the cost function weight being a time-varying parameter corresponding to the position point within the target planning duration.

8. A vehicle trajectory planning apparatus, comprising: a memory and a processor, the memory storing a computer program executable on the processor, the computer program, when executed by the processor, causing the processor to:

acquire an initial reference trajectory of a target vehicle within a target planning duration, the initial reference trajectory comprising an initial state variable and an initial control variable of the target vehicle at at least one position point within the target planning duration, acquire a reference lane trajectory;

for each position point in the target planning duration:
determine a geometric cost function sub-term of the target vehicle at the position point according to the reference lane trajectory, the initial state variable of the target vehicle, and a geometric constraint, and determine a dynamics cost function sub-term of the target vehicle at the position point according to the initial state variable and the initial control variable of the target vehicle and a dynamics constraint, the dynamics constraint comprising at least one of an energy loss, an acceleration constraint, or an angular speed constraint;

determine a trajectory cost of the target vehicle for at least one reference trajectory within the target planning duration according to at least one of the geometric cost function sub-terms of position points or the dynamics cost function sub-terms of the position points within the target planning duration, the at least one reference trajectory comprising the initial reference trajectory; and control the target vehicle to adjust from the initial reference trajectory of the target vehicle to a target travelling trajectory according to the trajectory cost of the target vehicle, wherein the controlling the target vehicle to adjust from the initial reference trajectory of the target vehicle to the target travelling trajectory according to the trajectory cost of the target vehicle comprises:

reversely calculating an optimal control rate of position points starting from a last position point within the target planning duration according to the trajectory cost;

successively adjusting a state variable and a control variable of the target vehicle according to the optimal control rate; and updating the trajectory cost of the target vehicle according to a current state variable and a current control variable of the target vehicle, and reversely recalculating the optimal control rate until a set iteration end condition is satisfied, to obtain the target travelling trajectory.

9. The vehicle trajectory planning apparatus according to claim 8, wherein the processor is further configured to:

determine a final step error sub-term of the target vehicle within the target planning duration according to a target state of the target vehicle and an initial state variable of the target vehicle at a last position point within the target planning duration; and determine the trajectory cost of the target vehicle within the target planning duration according to the geometric cost function sub-terms of the position points and the dynamics cost function sub-terms of the position points within the target planning duration and the final step error sub-term.

10. The vehicle trajectory planning apparatus according to claim 8, wherein the processor is further configured to:

determine a vehicle speed cost function sub-term of the target vehicle at the position point according to a target vehicle speed and a current vehicle speed of the target vehicle;

determine a reference trajectory deviation cost function sub-term of the target vehicle at the position point according to a current state variable of the target vehicle and a state variable on a reference trajectory at a current moment; and determine a reference lane deviation cost function sub-term of the target vehicle at the position point according to the reference lane trajectory and current position coordinates of the target vehicle.

11. The vehicle trajectory planning apparatus according to claim 10, wherein the processor is further configured to:

calculate a difference between the target vehicle speed and the current vehicle speed; and calculate the vehicle speed cost function sub-term of the target vehicle at the position point by using a vehicle speed cost function weight and the difference between the target vehicle speed and the current vehicle speed;

calculate a difference between the current state variable of the target vehicle and the state variable on the reference trajectory at the current moment; and calculate a reference trajectory deviation cost function sub-term of the target vehicle at the position point by using a reference trajectory deviation cost function weight and the difference between the current state variable of the target vehicle and the state variable on the reference trajectory at the current moment;

determine reference position coordinates of the target vehicle, a reference position of the target vehicle being a position on the reference lane trajectory corresponding to a current position of the target vehicle; and calculate the reference lane deviation cost function sub-term of the target vehicle at the position point by using a reference lane deviation cost function weight and the current position coordinates and the reference position coordinates of the target vehicle.

12. The vehicle trajectory planning apparatus according to claim 8, wherein the processor is further configured to:

determine an energy loss cost function sub-term of the target vehicle at the position point according to a current control variable of the target vehicle;

determine an acceleration cost function sub-term of the target vehicle at the position point according to an acceleration constraint and a current acceleration of the target vehicle; and determine an angular speed cost function sub-term of the target vehicle at the position point according to an angular speed constraint and a current angular speed of the target vehicle.

13. The vehicle trajectory planning apparatus according to claim 12, wherein the current control variable of the target vehicle comprises a current acceleration and a current angular speed of the target vehicle; and the processor is further configured to:

calculate the energy loss cost function sub-term of the target vehicle at the position point by using an energy loss cost function weight and the current acceleration and the current angular speed of the target vehicle;

determine a maximum acceleration and a minimum acceleration;

determine the acceleration cost function sub-term of the target vehicle at the position point according to a difference between the maximum acceleration and the current acceleration of the target vehicle, a difference between the current acceleration of the target vehicle and the minimum acceleration, and the acceleration constraint;

determine a maximum angular speed and a minimum angular speed according to a road adhesion coefficient; and determine the angular speed cost function sub-term of the target vehicle at the position point according to a difference between the maximum angular speed and the current angular speed of the target vehicle, a difference between the current angular speed of the target vehicle and the minimum angular speed, and the angular speed constraint.

14. The vehicle trajectory planning apparatus according to claim 8, wherein the cost function sub-term comprises a corresponding cost function weight, the cost function weight being a time-varying parameter corresponding to the position point within the target planning duration.

15. A non-transitory computer-readable storage medium, storing a computer program, the computer program, when executed by a processor, implementing:

acquiring an initial reference trajectory of a target vehicle within a target planning duration, the initial reference trajectory comprising an initial state variable and an initial control variable of the target vehicle at at least one position point within the target planning duration;

acquiring a reference lane trajectory;

for each position point in the target planning duration: determining a geometric cost function sub-term of the target vehicle at the position point according to the reference lane trajectory, the initial state variable of the target vehicle, and a geometric constraint, and determining a dynamics cost function sub-term of the target vehicle at the position point according to the initial state variable and the initial control variable of the target vehicle and a dynamics constraint, the dynamics constraint comprising at least one of an energy loss, an acceleration constraint, or an angular speed constraint;

determining a trajectory cost of the target vehicle for at least one reference trajectory within the target planning duration according to at least one of the geometric cost function sub-terms of position points or the dynamics cost function sub-terms of the position points within the target planning duration, the at least one reference trajectory comprising the initial reference trajectory; and controlling the target vehicle to adjust from the initial reference trajectory of the target vehicle to a target travelling trajectory according to the trajectory cost of the target vehicle, wherein the controlling the target vehicle to adjust from the initial reference trajectory of the target vehicle to the target travelling trajectory according to the trajectory cost of the target vehicle comprises:

reversely calculating an optimal control rate of position points starting from a last position point within the target planning duration according to the trajectory cost;

successively adjusting a state variable and a control variable of the target vehicle according to the optimal control rate; and updating the trajectory cost of the target vehicle according to a current state variable and a current control variable of the target vehicle, and reversely recalculating the optimal control rate until a set iteration end condition is satisfied, to obtain the target travelling trajectory.

* * * * *